(12) United States Patent
Hsieh

(10) Patent No.: US 6,642,961 B1
(45) Date of Patent: Nov. 4, 2003

(54) METHOD OF DEFECTIVE PIXEL ADDRESS DETECTION FOR IMAGE SENSORS HAVING WINDOWING FUNCTION

(75) Inventor: Ming-Tsun Hsieh, Mountain View, CA (US)

(73) Assignee: Vanguard International Semiconductor Corp., Hsinchu (TW)

( * ) Notice: Subject to any disclaimer, the term of this patent is extended or adjusted under 35 U.S.C. 154(b) by 470 days.

(21) Appl. No.: 09/671,566

(22) Filed: Sep. 27, 2000

Related U.S. Application Data

(60) Provisional application No. 60/217,821, filed on Jul. 12, 2000.

(51) Int. Cl.[7] ............... H04N 9/64; G01R 31/26; H01L 31/062; G06K 7/00
(52) U.S. Cl. ............... 348/247; 324/765; 324/770; 257/292; 382/312
(58) Field of Search ................ 714/718, 719; 324/765, 770; 257/292; 382/312; 348/246, 247

(56) References Cited

U.S. PATENT DOCUMENTS

| | | | | |
|---|---|---|---|---|
| 5,416,516 A | * | 5/1995 | Kameyama et al. | 348/246 |
| 5,617,484 A | * | 4/1997 | Wada et al. | 382/172 |
| 5,854,655 A | * | 12/1998 | Watanabe et al. | 348/247 |
| 6,005,977 A | * | 12/1999 | Tanimizu et al. | 382/216 |
| 6,160,281 A | * | 12/2000 | Guidash | 257/292 |
| 6,177,920 B1 | * | 1/2001 | Koyama et al. | 345/100 |
| 6,181,830 B1 | * | 1/2001 | Sato | 382/274 |
| 6,307,393 B1 | * | 10/2001 | Shimura | 324/765 |
| 6,381,357 B1 | * | 4/2002 | Tan et al. | 382/141 |
| 6,396,539 B1 | * | 5/2002 | Heller et al. | 348/246 |
| 6,504,572 B2 | * | 1/2003 | Kramer et al. | 348/246 |
| 6,509,927 B1 | * | 1/2003 | Prater et al. | 248/222.1 |

* cited by examiner

Primary Examiner—Albert Decady
Assistant Examiner—Anthony T. Whittington
(74) Attorney, Agent, or Firm—J. C. Patents

(57) ABSTRACT

A method of defective pixel address detection for an image sensor. The method comprises comparing a defective pixel address with a sensor address; outputting a defective pixel flag if the sensor address is equal to the defective pixel address; increasing an index by one; increasing the index by one if the sensor address is larger than the defective pixel address and the index value is not equal to zero, otherwise performing a following step; increasing the index by one if the sensor address is larger than the defective pixel address and the index value is equal to zero and a frame begins, otherwise performing a following step; comparing the defective pixel address with an empty signature; increasing the index by one if the defective pixel address is equal to the empty signature; and returning to the beginning step if the defective pixel address is not equal to the empty signature.

9 Claims, 3 Drawing Sheets

Defective pixel address
(Row addr + Col. addr)

| index → 0 | 0000_0000_0000_0000_0100 |
|---|---|
| 1 | 0000_0000_0000_0000_0101 |
| 2 | 0000_0000_0000_0000_0110 |
| ⋮ | ⋮ |
| 126 | 0000_1000_0000_0000_0000 |
| 127 | 0000_1000_0000_0000_0001 |

10

Defective pixel address
(row addr + col. addr)

| index | |
|---|---|
| 0 | 0000_0000_0000_0000_1000 |
| 1 | 0000_0000_0000_0000_1001 |
| 2 | 0000_0000_0000_0000_1010 |
| 3 | 0000_0000_0000_0000_1011 |
| 4 | 0000_0000_0000_0010_0000 |
| 5 | 0000_0000_0000_0010_0001 |
| 6 | 0000_0000_0000_0010_0010 |
| 7 | 0000_0000_0000_0010_0011 |
| ⋮ | |
| 125 | 0000_1000_0000_0000_0000 |
| 126 | 0000_1000_1000_0000_0000 |
| 127 | 0000_1000_1100_0000_0000 |

Window range (indices 4 to 125)

FIG. 3

METHOD OF DEFECTIVE PIXEL ADDRESS DETECTION FOR IMAGE SENSORS HAVING WINDOWING FUNCTION

CROSS-REFERENCE TO RELATED APPLICATION

This application claims the priority benefit of U.S. Provisional Application Ser. No. 60/217,821, filed Jul. 12, 2000, the full disclosure of which is incorporated herein by reference.

BACKGROUND OF THE INVENTION

1. Field of Invention

The present invention relates to a method of pixel address detection of an image sensor having windowing function. More particularly, the present invention relates to a method of defective pixel address detection of an image sensor having windowing function.

2. Description of Related Art

As the multimedia era is coming, digital information, such as digital images or digital movies, becomes more popular. Modem technology has highly developed, and the cost of image sensors for generating digital images or pictures reduces. More people can access these high technological products. However, there are still some problems about the image sensors.

Due to the current process, it is hard to fabricate an image sensor perfectly without any bad or defective pixel thereon. Therefore, there are always some defective pixels on the image sensor after it is fabricated. The image or picture sensed by the defective pixels will affect the quality of the image or picture. And the following imaging procedure, such as color processing or image compressing etc, will also affected. How to ship the defective pixels of the image sensor becomes a significant topic.

The method for solving such problems can be restoring a set of defective pixel addresses first. And then the pixels of the image sensor are read in sequence to compare with the defective pixel addresses, by which the defective pixels can be detected while the image sensor operates. However, if the image sensor has a window function, the pixels of the image sensor are not sensed in sequence, but from one pixel address to another non-consecutive pixel address. If the non-consecutive pixel address is larger than the currently indexed memory element contents, there is not a hit. The index is struck and not moving under this condition. The detection for the defective pixel addresses fails to function.

To solve these problems, according to conventional schemes, a more complicated algorithm or another tag bit in a memory element is used. However, the conventional methods increase the cost of the image sensor due complexity and increasing size of the image sensor.

SUMMARY OF THE INVENTION

The invention provides a method of defective pixel address detection for an image sensor. A plurality of defective pixel addresses are stored first during the image sensor is tested. A pixel address of the image sensor is read and one of the defective pixel addresses is fetched. The first fetched defective pixel address is compared with the pixel address of the sensor address, and then a defective pixel flag is outputted if the pixel address is equal to the defective pixel address. An index value is increased by one unit and another defective pixel address which is indexed next to the first fetched defective pixel address is fetched. The first fetched defective pixel address is compared with the pixel address of the sensor address and further determines the index value if the pixel address is not equal to the defective pixel address. The index value is increased by one unit and fetching another defective pixel address which is indexed next to the first fetched defective pixel address if the pixel address of the sensor address is larger than the first fetched defective pixel address and the index is not equal to zero. Determine whether a frame begins if the pixel address of the sensor address is not larger than the first fetched defective pixel address or the index is equal to zero. The index value is increased by one unit and fetching another defective pixel address which is indexed next to the first fetched defective pixel address if the pixel address of the sensor address is larger than the first fetched defective pixel address and the index is not equal to zero and the frame begins.

The defective pixel address is compared with an empty signature if the pixel address of the sensor address is not larger than the first fetched defective pixel address and the index is not equal to zero and no frame begins. The index value is increased by one unit if the defective pixel address is the empty signature, and then fetching another defective pixel address which is indexed next to the first fetched defective pixel address; and fetching another defective pixel address which is indexed next to the first fetched defective pixel address if the defective pixel address is not the empty signature.

Advantageously, the present invention provides an effective and efficient method for determining whether the pixel of the image sensor is defective, by which the following color processing and image compression etc can be significantly simplified. In addition, the method of defective pixel address detection for an image sensor is in a simple and low cost way.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIG. 1 schematically shows a block diagram for carrying out the method of the present invention;

FIG. 3 illustrates a schematic diagram of the format of the memory element for storing the defective pixel addresses having a windowing range according to one preferred embodiment of this invention.

DESCRIPTION OF THE PREFERRED EMBODIMENTS

Figures 1, 2:
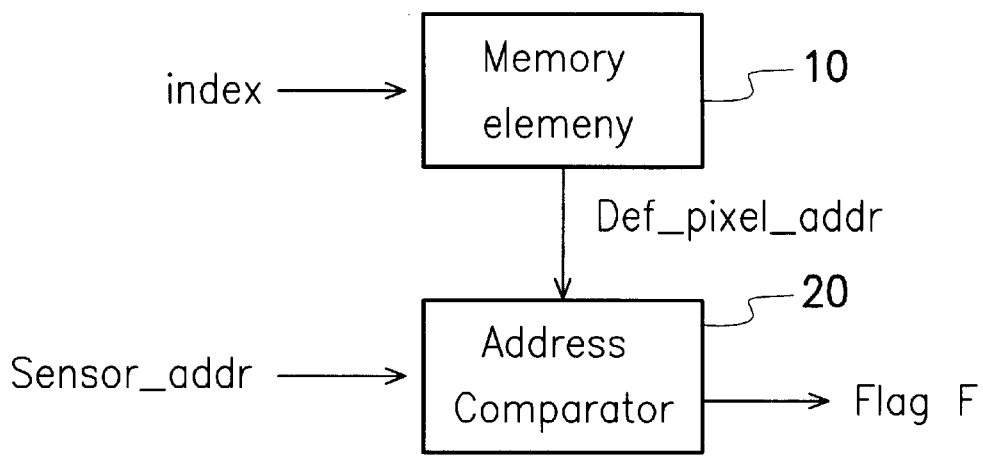
FIG. 2 illustrates a schematic diagram of the format of the memory element for storing the defective pixel addresses having a windowing range according to conventional method.

FIG. 1 schematically shows a block diagram for carrying out the method of the present invention. The circuit of defective pixel address detection for image sensor comprises at least a memory element 10 and an address comparator 20.

The memory element 10 is used for storing the defective pixel addresses which are detected during the image sensor is tested. The memory element 10 can be a fuse array, for example. The address comparator 20 receives a current sensor address of the image sensor Sensor_addr and fetches a defective pixel address Def_pixel_addr from the memory element 10. The address comparator 20 then compares the two addresses Sensor_addr and Def_pixel_addr. If the two addresses, Sensor_addr and Def_pixel_addr, are the same, which means a hit, the address comparator 20 generates a flag bit F to indicate that the current sensor address of the image sensor is a defective pixel. The index of the memory element 10 is increased by one unit, such as 1, to begin another cycle of address comparison. If the two addresses, Sensor_addr and Def_pixel_addr, are not the same, which means a miss, the address comparator 20 sets the flag bit F to a value, such as 0, to indicate that the current sensor address of the image sensor is a good pixel. And then another cycle of address comparison is begun.

When the image sensor has a windowing function, the pixels of the image sensor are not sensed in sequence, but from one pixel address to another non-consecutive pixel address which forms a windowing range. If the non-consecutive pixel address is larger than the contents of the currently indexed memory element, there is not a hit for the currently indexed memory element contents. Namely, the index is struck and not moving under this condition. The detection for the defective pixel addresses fails to function. FIG. 2 shows the situation.

FIG. 2 illustrates a schematic diagram of the format of the memory element for storing the defective pixel addresses having a windowing range according to conventional method. As shown in FIG. 2, the windowing range 10' only includes those addresses from index 5 to index 125. For those defective pixel addresses outside the windowing range 10', there is no hit and the index does not move under the condition. In the case, the index stays at location 0 and does not move because there is not any hit for the address at index 0. In other words, the defective pixel address detection fails when the image sensor is in the window mode.

For solving the window function with a minimum cost, two properties of the contents of the memory element 10 are provided. First, the defective pixel addresses stored in the memory element 10 is in an ascending order; and second, the currently indexed contents are always larger than or equal to the current sensor address to have a hit condition. In the window mode, the pixel address of the image sensor jumps from on pixel address to another non-consecutive pixel address, which is larger than the contents of the currently indexed memory element 10. A hit flag is generated for making its index move to the next position.

Therefore, after several cycles, the index of the memory element 10 is pointed to the contents which are larger than or equal to the current pixel address of the image sensor. FIG. 3 shows the situation.

As shown in FIG. 3, when the address jumps from address 0000_0000_0000_0000_0000 to the window starting address 0000_0000_0000_0001_0000 of the windowing range 10', the address comparator 20 (shown in FIG. 1,) detects that the indexed defective pixel address 0000_0000_0000_0000_1001 is less than the current image sensor address. The address comparator 20 forces the index to move from index 0 to index 1 by generating a hit flag. After two more clock cycles, the index is at index 4 which is within the windowing range 10'. Therefore, the index is not struck and detection for the defective pixel addresses still functions well.

Furthermore, when the index wraps around to the beginning and the pixel address of the image sensor has not reached the end of the current frame, a special scheme is needed because the current pixel address of the image sensor is large than the indexed contents of the memory element 10, and the index is not needed to be increased at this time. The large-than comparison method for the index at the beginning of the memory element 10 must wait until the current pixel address of the image sensor wraps around and begins with (0,0).

Silo In addition, if the number of the defective pixel addresses is less than that of the memory element 10, empty signatures are put in the remained locations of the memory element 10. The index moves to the next position when the empty signature is detected. The index finally wraps around to the beginning of the memory element 10. And in the next frame, the defective pixel address detection begins.

Figure 4:
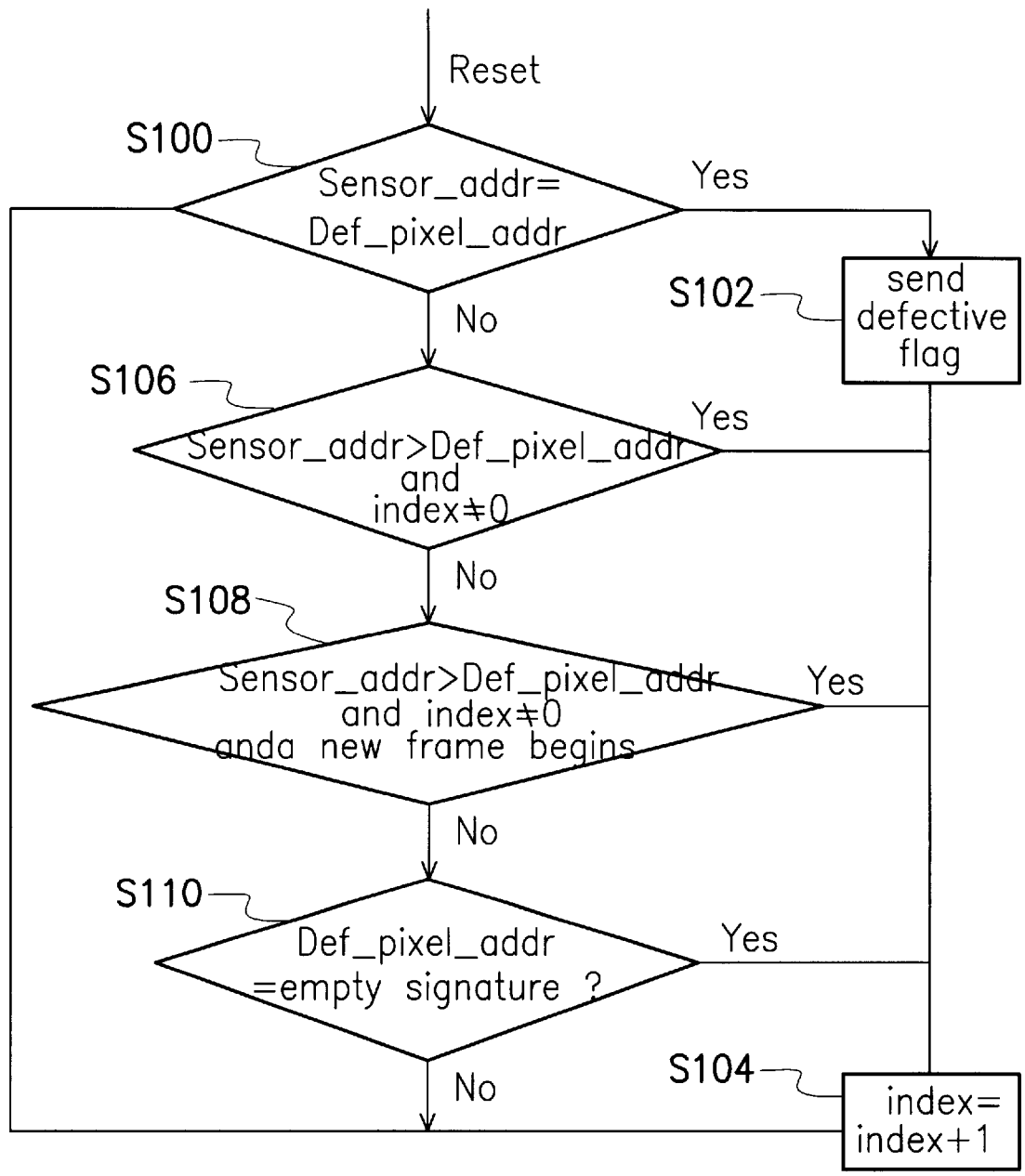
FIG. 4 schematically shows a flow chart of the method of defective pixel address detection for image sensor.

Referring to FIGS. 4 and 1, according to the embodiment of the present invention, after an image sensor is fabricated, the image sensor is tested for finding defective pixels on the image sensor. The detected defective pixel addresses are then stored into the memory element 10 in an ascending order. The memory element 10 further comprises an index for indicating the current fetched defective pixel address, which as shown in FIG. 3.

As the image sensor operates, a reset step is performed, by which the index of the memory element 10 indicated the first location that will be fetched first as following, and the image sensor is set to the first pixel waiting for sensing.

When the sensing process begins, the pixel addresses of the image sensor are read in a windowing way. After one pixel address of the image sensor is read by the address comparator 20, the address comparator 20 further fetches a defective pixel address indicated by the index 0 from the memory element 10.

As shown in FIG. 4, the step S100 is then performed. The address comparator 20 receives the pixel address of the image sensor Sensor_addr and the defective pixel address Def_pixel_addr, and compares the two addresses. If the address Sensor_addr hits the address Def_pixel_addr, which means the same, the step S102 is performed. Namely, the address comparator 20 outputs a defective pixel flag F for indicating the current pixel of the image sensor is a defective or bad pixel.

After the defective pixel flag F is outputted, the step S104 is performed to increase the index of the memory element 10 by one, for example index 1 as shown in FIG. 3. After the index is increased by one, another address comparison cycle begins. Namely, the address comparator 20 read another pixel address of the image sensor and next defective pixel address indicated by index 1.

In the S100 of the address comparison, if the addresse Sensor_addr misses the address Def_pixel_addr, which means not the same, the step S106 is performed.

At the step S106, if the address Sensor_addr is greater than the address Def_pixel_addr and the index is not equal to 0, the step 104 is performed to increase the index of the memory element 10 by one. After the index is increased by one, another address comparison cycle begins. The process returns to the step S100. Namely, the address comparator 20 read another pixel address of the image sensor and next defective pixel address. In addition, if the address Sensor_addr is not greater than the address Def_pixel-addr or the index is not equal to 0, the step S108 is performed.

At the step S108, if the address Sensor_addr is greater than the address Def_pixel_addr and the index is not equal to 0 and a new frame begins, the step 104 is performed to increase the index of the memory element 10 by one. After the index is increased by one, another address comparison cycle begins. The process returns to the step S100. Namely, the address comparator 20 read another pixel address of the image sensor and next defective pixel address. In addition, if the address Sensor_addr is not greater than the address Def_pixel_addr or the index is not equal to 0 or no new frame begins, the step S110 is performed.

At the step S110, whether the address Def_pixel_addr is an empty signature is determined. The empty signature, for example, has a format of 1111_1111_1111_1111_1111. When the empty signature is detected, the index is forced to be increased by one. Namely, the empty signature of the defective pixel address is detected, the step S104 is performed to increase the index by one. After the index is increased by one, another address comparison cycle begins. Namely, the step S100 is performed and the address comparator 20 read another pixel address of the image sensor and next defective pixel address.

Furthermore, at the step S36, if the defective pixel address is not an empty signature, the procedure returns to the step S100. The address comparator 20 read another pixel address of the image sensor and next defective pixel address.

Accordingly, the present invention provides an effective and efficient method for determining whether the pixel of the image sensor is defective during operation of the image sensor. The following color processing and image compression etc can be significantly simplified. In addition, the method of defective pixel address detection for image sensor is in a simple and low cost way.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of defective pixel address detection for an image sensor, comprising:
    (a) comparing a defective pixel address with a sensor address of the image sensor, wherein the defective pixel address is stored in a memory element in advance when the image sensor is tested;
    (b) outputting a defective pixel flag if the sensor address is equal to the defective pixel address;
    (c) increasing an index value by one unit and returning to the step (a);
    (d) increasing the index value by one unit and returning to the step (a) if the sensor address is larger than the defective pixel address and the index value is not equal to zero, otherwise performing a following step (e);
    (e) increasing the index value by one unit and returning to the step (a) if the sensor address is larger than the defective pixel address and the index value is equal to zero and a frame begins, otherwise performing a following step (f);
    (f) comparing the defective pixel address with an empty signature;
    (g) increasing the index value by one unit if the defective pixel address is equal to the empty signature, and returning to the step (a); and
    (h) returning to the step (a) if the defective pixel address is not equal to the empty signature.

2. The method of claim 1, wherein the defective pixel address stored in the memory element is in an ascending order.

3. The method of claim 1, wherein the memory element is a fuse array.

4. The method of claim 1, wherein the defective pixel address stored in the memory element is in a format consisting of a row address and a column address of the image sensor.

5. A method of defective pixel address detection for an image sensor, comprising the steps of:
    storing a plurality of defective pixel addresses during the image sensor is tested;
    reading a pixel address of the image sensor;
    fetching one of the defective pixel addresses;
    comparing the first fetched defective pixel address with the pixel address of the sensor address;
    outputting a defective pixel flag if the pixel address is equal to the defective pixel address;
    increasing an index value by one unit and fetching another defective pixel address which is indexed next to the first fetched defective pixel address;
    comparing the first fetched defective pixel address with the pixel address of the sensor address and further determining the index value if the pixel address is not equal to the defective pixel address;
    increasing an index value by one unit and fetching another defective pixel address which is indexed next to the first fetched defective pixel address if the pixel address of the sensor address is larger than the first fetched defective pixel address and the index is not equal to zero;
    further determining whether a frame begins if the pixel address of the sensor address is not larger than the first fetched defective pixel address or the index is equal to zero;
    increasing an index value by one unit and fetching another defective pixel address which is indexed next to the first fetched defective pixel address if the pixel address of the sensor address is larger than the first fetched defective pixel address and the index is equal to zero and the frame begins;
    comparing the defective pixel address with an empty signature if the pixel address of the sensor address is not larger than the first fetched defective pixel address and the index is not equal to zero and no frame begins;
    increasing the index value by one unit if the defective pixel address is the empty signature, and then fetching another defective pixel address which is indexed next to the first fetched defective pixel address; and
    fetching another defective pixel address which is indexed next to the first fetched defective pixel address if the defective pixel address is not the empty signature.

6. The method of claim 5, wherein the plurality of the defective pixel addresses are stored in a memory element.

7. The method of claim 6, wherein the defective pixel addresses stored in the memory element is in as ascending order.

8. The method of claim 6, wherein the defective pixel address stored in the memory element is in a format consisting of a row address and a column address of the image sensor.

9. The method of claim 6, wherein the memory element is a fuse array.

* * * * *